(12) United States Patent
Lu

(10) Patent No.: US 7,861,558 B2
(45) Date of Patent: Jan. 4, 2011

(54) METHOD OF MAKING ASSEMBLIES OF MULTI-FIBER WITH IRREGULAR HEXAGONAL ARRAY

(75) Inventor: Chun-I Lu, Taipei (TW)

(73) Assignee: Taiwan Fiber Optics, Inc., Taipei (TW)

( * ) Notice: Subject to any disclaimer, the term of this patent is extended or adjusted under 35 U.S.C. 154(b) by 592 days.

(21) Appl. No.: 11/873,427

(22) Filed: Oct. 17, 2007

(65) Prior Publication Data
US 2009/0103872 A1    Apr. 23, 2009

(51) Int. Cl.
*G02B 6/04* (2006.01)

(52) U.S. Cl. .............................. 65/406; 65/408; 65/409; 385/115

(58) Field of Classification Search .................. 65/406, 65/408, 409; 385/115
See application file for complete search history.

(56) References Cited

U.S. PATENT DOCUMENTS 5,223,013 A * 6/1993 Cook et al. .................... 65/409
6,598,428 B1 * 7/2003 Cryan et al. .................. 65/409

\* cited by examiner

*Primary Examiner*—Matthew J. Daniels
*Assistant Examiner*—Queenie Dehghan
(74) *Attorney, Agent, or Firm*—Leong C. Lei

(57) ABSTRACT

A method of making a multi-fiber assembly with irregular hexagonal array, which includes the steps of forming a plurality of primitives each made of a plurality of fibers, said fibers having cylindrical outer surfaces of same diameter and being arranged in an irregular hexagonal array, said irregular hexagonal array having six sides wherein three alternate sides of said primitive are each composed of n fibers and the other three alternate sides of said primitive 11 are each composed of n−1 fibers; and bringing together said primitives in such a way that sides with n fibers of said primitives are in contact with sides with n−1 fibers of other primitive thereby arranging said fibers at a central portion among said primitives in alignment with one another and therefore preventing said fibers at said central portion from squeezing one another.

2 Claims, 2 Drawing Sheets

METHOD OF MAKING ASSEMBLIES OF MULTI-FIBER WITH IRREGULAR HEXAGONAL ARRAY

CROSS-REFERENCE

This application is related to U.S. patent application Ser. Nos. 11/383,757 and 11/425,146, owned by the same applicant.

BACKGROUND OF THE INVENTION (a) Field of the Invention

This invention is related to a method of making assemblies of multi-fiber with irregular hexagonal shapes, and in particular to one which can properly pack a plurality of fibers together.

(b) Description of the Prior Art

Bringing together a plurality of optical fibers in peak-to-valley relationship and fusing them then into subassemblies later then fused together to produce a final array are well known in the prior art.

Nevertheless, the fibers at the central portion among the subassemblies will squeeze one another thereby lowering the light transmissibility. Furthermore, the conventional method is complicated thus increasing the cost.

Therefore, it is object of the present invention to provide an improved method which can obviate and mitigate the above-mentioned drawbacks.

SUMMARY OF THE INVENTION

This invention is directed to a method of making assemblies of multi-fiber with irregular hexagonal array.

It is the primary object of the present invention to provide a method of making a multi-fiber assembly with irregular hexagonal array which includes steps of: forming a plurality of primitives each made of a plurality of fibers, said fibers having cylindrical outer surfaces of same diameter and being arranged in an irregular hexagonal array, said irregular hexagonal array having six sides wherein three alternate sides of said primitive are each composed of n fibers and the other three alternate sides of said primitive 11 are each composed of n−1 fibers; and bringing together said primitives in such a way that sides with n fibers of said primitives are in contact with sides with n−1 fibers of other primitive thereby arranging said fibers at a central portion among said primitives in alignment with one another and therefore preventing said fibers at said central portion from squeezing one another.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
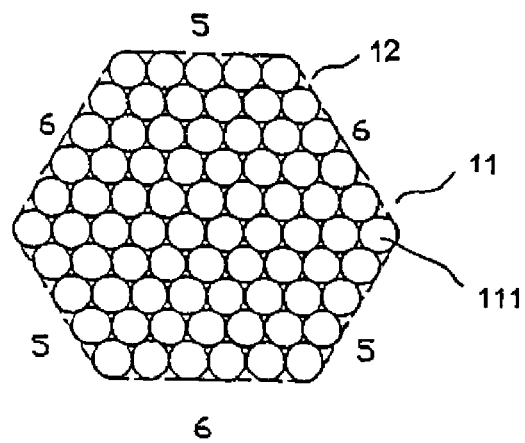
FIG. 1 is a cross-sectional view of a primitive according to the present invention.

As shown in FIG. 1, a fused fiber array according to the present invention is made of three primitives 11 each made of a plurality of fibers 111. The fibers 111 have cylindrical outer surfaces of the same diameter and are arranged in an array with a hexagonal cross-section. The fibers 111 are wrapped inside a cladding 12 which are then fused together under a high temperature in vacuum. The hexagonal array has six sides wherein the first one is composed of six fibers 111, the second one composed of seven fibers 111, the third one composed of six fibers 111, the fourth one composed of seven fibers 111, the fifth one composed of six fibers 111, and the sixth one composed of seven fibers 111. That is to say, the primitive 11 has six sides wherein three alternate sides of the primitive 11 are each composed of n fibers and the other three alternate sides of the primitive 11 are each composed of n−1 fibers. For instance, as shown in FIG. 1, three alternate sides of the primitive 11 are each composed of six fibers 111 and the other three alternate sides of the primitive 11 are each composed of seven fibers 111.

Figure 2:
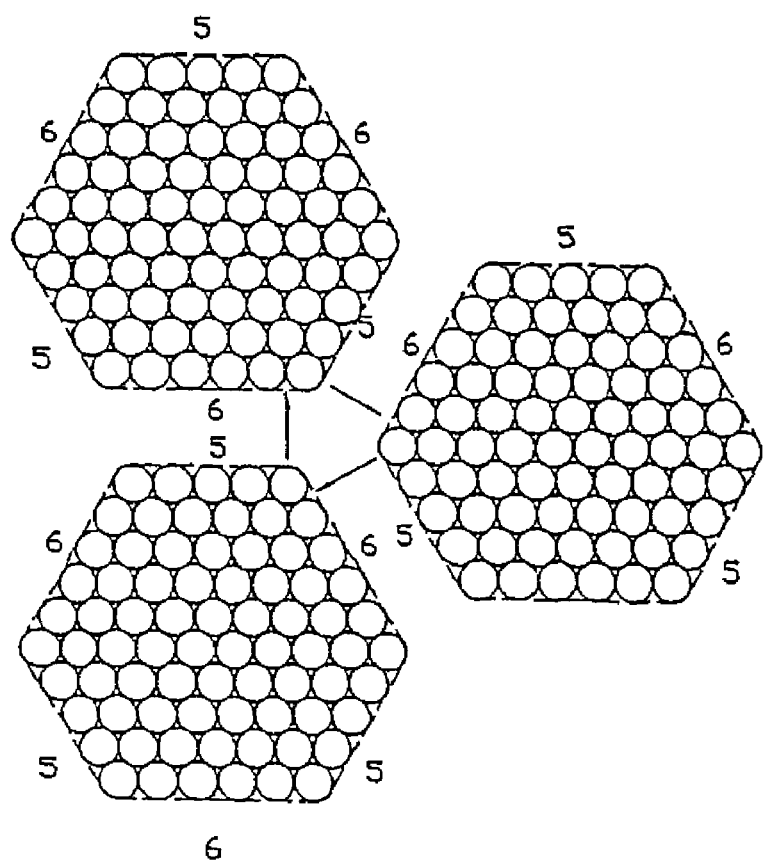
FIG. 2 illustrates how to bring together three primitives.
Figure 3:
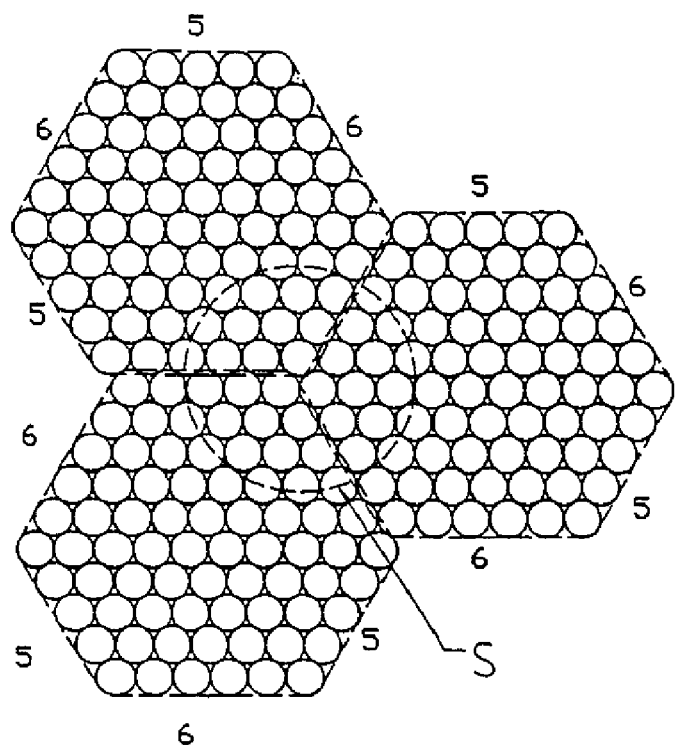
FIG. 3 illustrates the engagement between three primitives.
Figure 4:
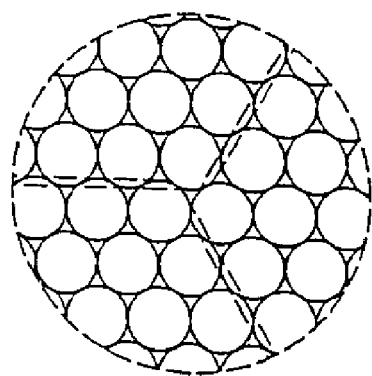
FIG. 4 is an enlarged view of the central portion of FIG. 3.

Referring to FIGS. 1, 2 and 3, a plurality of fibers 111 are arranged together to form a hexagonal primitive 11 which has three alternate sides each composed of n fibers and three other alternate sides composed of n−1 fibers. Then, three primitives 11 are brought together in such a way that the sides with n fibers of the primitives 11 are in contact with the sides with n−1 fibers of other primitives 11. The fibers 111 at the central portion among the three primitives 11 are arranged so that the fibers 111 of one of the primitives 11 are aligned with the fibers of the other two primitives 11 (see FIG. 4). As a consequence, the fibers 111 of the primitives 11 will not squeeze one another thereby improving the light transmissibility of the array and simplifying the manufacturing process.

It will be understood that each of the elements described above, or two or more together may also find a useful application in other types of methods differing from the type described above.

While certain novel features of his invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A method of making a multi-fiber assembly with irregular hexagonal array, comprising steps of:

forming a plurality of primitives each made of a plurality of fibers, said fibers having cylindrical outer surfaces of same diameter and being arranged in an irregular hexagonal array, said irregular hexagonal array having six sides wherein three alternate sides of said primitive are each composed of n fibers and the other three alternate sides of said primitive are each composed of n−1 fibers; and bringing together said primitives in such a way that sides with n fibers of said primitives are in contact with sides with n−1 fibers of other primitive thereby arranging said fibers at a central portion among said primitives in alignment with one another and therefore preventing said fibers at said central portion from squeezing one another.

2. The method of making a multi-fiber assembly with irregular hexagonal array as claimed in claim 1, wherein n is equal to 6.